United States Patent [19]

Finck

[11] 3,991,514

[45] Nov. 16, 1976

[54] HYDROPONIC DEVICE AND METHOD

[76] Inventor: Darrel S. Finck, 4180 East Ave., Hayward, Calif. 94544

[22] Filed: June 27, 1975

[21] Appl. No.: 591,113

[52] U.S. Cl. .................................... 47/1.2; 47/16
[51] Int. Cl.[2] .................................... A01G 31/00
[58] Field of Search .................... 47/1.2, 14–16, 47/48.5; 239/338

[56] References Cited
UNITED STATES PATENTS

| | | | |
|---|---|---|---|
| 2,952,096 | 9/1960 | Hughes et al. | 47/1.2 |
| 3,425,158 | 2/1969 | Kyle | 47/1.2 |
| 3,458,951 | 8/1969 | Martin | 47/1.2 |
| 3,664,061 | 5/1972 | Oepen | 47/1.2 |

FOREIGN PATENTS OR APPLICATIONS

| | | | |
|---|---|---|---|
| 1,066,645 | 6/1954 | France | 47/14 |
| 483,733 | 4/1938 | United Kingdom | 47/14 |
| 502,668 | 3/1939 | United Kingdom | 47/1.2 |

*Primary Examiner*—Edgar S. Burr
*Assistant Examiner*—James R. Feyrer
*Attorney, Agent, or Firm*—Warren, Chickering & Grunewald

[57] ABSTRACT

There is disclosed a device for hydroponic growth of plants which includes an elongated chamber having an inlet door, an outlet door, and an interior designed to support vertically spaced trays which are arranged to be advanced one tray-length each day from the inlet door toward the outlet door. The trays are illuminated with light adapted to promote photosynthesis after advancing three tray-lengths through the chamber. The chamber is at least seven tray-lengths long and is provided with sprays above the top row of trays. The trays have corrugated bottoms with drain holes in the lowermost portion of each corrugation.

2 Claims, 4 Drawing Figures

HYDROPONIC DEVICE AND METHOD

BACKGROUND OF THE INVENTION

Hydroponics is the soilless growing of plants. Hydroponics is an especially useful technique for producing food for livestock. The advantages of the use of hydroponics to produce livestock are that fresh food is available all year, the food that is available is free from undesirable materials such as weeds, wild garlic and onion plants, insects, dust, insecticides, radioactive fallout, to name a few. The product is also free of soil so the animals can eat the entire plant, root and all.

Properly designed hydroponic devices can yeild can enormous output of plant material in a short time. The yield is large and quick because of the opportunity to control germination, temperature, light, and food for the plants. It is not unusual to produce a nine-inch growth of grass from barley seed in 7 days, and the growth of grass produces a seven-fold increase in weight over the weight of the seeds that were employed.

Additionally, hydrophonic devices generally are less expensive to operate than growing the same amount of plant material in an open field. They are less expensive from the capital investment point of view because it is not necessary to own large amounts of land; and it is also less expensive from an operational point of view because extremely high yeilds can be obtained without much labor and without much machinery which is necessary to till and fertilize soil. Additionally, harvesting the products from a hydrophonic device is very easy. However, hydroponic growth of plant materials still involves many problems.

Among the problems are that the ideal growing conditions within the hydroponic device is very attractive to undesirable plant species such as fungus; energy consumption is high to provide adequate light for photosynthesis; and growing plants generate heat which must be removed if the temperature is to be maintained properly.

THE INVENTION

This invention is a hydroponic device that is small, compact, capable of enormous production per unit of volume, not susceptible to fungus growth and particularly adapted to control the growth of fungus, economical of energy, and particularly adapted to modular use. The hydroponic device of this invention is in the general overall shape of an elongated chamber having and inlet door on one end and an outlet door on the other. The chamber is provided with a ceiling, a floor, and sidewalls; and the ceiling, floor, and sidewalls are made of a smooth, nonporous material such as a hard enamel. The sidewalls are provided with a number of elongated supports which are mounted in pairs so that they can support trays horizontally. The supports are mounted on the sidewalls but spaced from them, and the supports are mounted one below the other spaced preferably at about 9 inch vertical intervals.

A number of trays are positioned horizontally on the supports, and the trays are as wide as the chamber and at most one-seventh of the length of the chamber. In other words, on each pair of supports at least seven trays can be maintained at the same horizontal level within the chamber. The chamber may have any number of pairs of supports so that a number of rows of horizontally positioned trays may be maintained within the chamber. There is no logical limit to the number of vertically spaced horizontal layers of trays that may be employed in the device, although for ease of use more than ten rows of trays is generally avoided.

Each of the trays is provided a perimeter for engaging the support, and each has a corrugated bottom wherein the upper portion of each corrugation is rounded and the lower portion of each corrugation is spaced closely adjacent to the lower portion of the next corrugation, the distance being such that the seeds being grown in the device cannot reach the bottom of the corrugation. The lower portion of each of the corrugations is provided with a number of drainage holes which are preferably in the form of V-shaped notches so that liquid draining from the lower portion of a corrugation will not run from the tray as a stream but will preferably wet the bottom of the corrugation and run along dropping off at random positions onto the tray below.

The interior wall of the chamber is also provided with illumination sources which are suitable for promoting photosynthesis. Ordinary fluorescent tubes may be employed. The illumination sources are positioned within the chamber so that they illuminate the interior of each tray from an intermediate point in the length of the chamber to the outlet door of the chamber. Germination of a seed does not require light, and it is simply wasted energy to subject germinating seeds to light. However, as soon as a seed sprouts, light is required to promote vigorous growth and large absorption of the nutrients in the liquid solution.

In a preferred embodiment of the invention, the fluorescent tubes are spaced closely adjacent the sidewalls of the chamber and are surrounded with a transparent shield that is fixed so that liquid does not strike the light source nor does it run down the chamber wall behind the light source. In this preferred embodiment, a number of vents extend from beneath the shield, through the sidewall to the exterior of the chamber so that normal circulation of air will carry the heat from the sources outside of the chamber.

In a more preferred embodiment, a baffle or damper is provided so that the vent may be opened or closed, and a small vent or opening through the shield may be opened or closed by moving the baffle or damper between extreme positions. In this embodiment, in winter when heat is required to maintain the temperture within the chamber, the heat developed by the light source may be employed to maintain the temperature warm enough within the chamber. However, in summer when the heat generated by the light source, the growing of the plant, and even the outside atmosphere must be removed through refrigeration means, the baffle or damper can be positioned so that at least the heat from the light source is vented from within the chamber so that the refrigeration means does not have to deal with it.

Ordinarily, seeds require 3 days to germinate, and it is accordingly a preferred embodiment of this invention that the light sources illuminate the interior of the chamber from the outlet door to an intermediate position three tray-lengths from the inlet door. The interior of the chamber is also provided with a means for subdividing liquid which may be simple spray heads fixed to the ceiling of the chamber and adapted to spray the interior of the uppermost layer of trays. The sprays or other subdividing means run intermittently so that the seeds and plant material are provided with an adequate amount of moisture but are not submerged with water.

In the preferred embodiment of the invention, the means for subdividing liquid subdivides the liquid very finely, preferably in the form of a slow settling fog so that the seeds and plant material can be subjected to the moisture for relatively long periods of time without pools of water accumulating in the trays.

The trays, formed as described above, are especially adaptable to hydroponic growth of plants. The seeds never are submerged in liquid except for those few, rare instances when the spraying device has been on too long or immediately at the end of the end of the spraying interval. The moisture runs through the seeds or the plant life and into the corrugations of the tray from where it drains through the holes in the bottom of each corrugation and drops to the tray below where the liquid again trickles through a layer of seeds or plant material, disengages from the plant material or seeds in the corrugations and drops again to the tray below, repeating the process until it accumulates as a pool on the floor of the device of this invention. In the later stages of growth, plant root material will fill the corrugations and will even protrude from the holes in the bottom of the trays, but the holes can be provided of sufficient number and size so that good drainage; and, of almost equal importance, good air circulation around the roots and around the seeds is provided throughout both the germination and the growing period.

One particularly desirable means for subdividing liquid is an ultrasonic nebulizer such as the one described in U.S. Pat. No. 3,861,386. Such an ultrasonic nebulizer produces a very slowly settling fog which fills the entire chamber and subjects the entire interior to approximately the same conditions of moisture. Any moisture collected in a tray after termination of the operation of the nebulizer will run through from tray to tray and collect on the floor of the chamber as described hereinabove.

The liquid collected on the floor of the chamber or in a sump provided in the floor of the chamber is circulated with a suitable pump to the spray nozzles or nebulizers that distribute the liquid above the uppermost tray. Of course, the pump will only be operable during those intermittent periods when treating the seeds and plants with solution are desired. It is desired that the discharge of the pump is connected to a suitable filter to remove undesirable solids such as fragments of roots or seeds, fungus or mold spores, particles of metal, or other such contaminents.

The structure, as described hereinabove, has many desirable features which make it both efficient and economical for producing large quantities of plant material. The chambers generally are fairly narrow and can be stacked side by side so that modular use is very easy. The chambers are fed from one end end emptied from the other so that it is rarely necessary for an operator to enter the chamber which greatly reduces introduction of undesirable material such as fungus or mold spores into the chamber. Since each verticaly aligned portion of the chamber is involved in a different aspect of the growth cycle, it is easy to adapt each tray to conditions ideal for its particular stage of development. Thus, during the germination period, the seeds may be watered more abundantly or less abundantly than the germinated seeds in a different portion of the chamber. The seeds in the germination portion of the chamber also are not subjected to light and accordingly are subjected to less heat which is desirable for seed germination. Only sprouted plants are exposed to light, and the light is of the proper intensity to promote growth at the maximum rate.

The interior of the chamber is made of nonporous material, and substantially all aspects of the interior are spaced from the wall so that the liquid sprayed into the upper portion of the chamber provides a washing action along the walls of the chamber, whereby the chamber walls are maintained very clean. It has been found that any mold, mildew, or fungus that does get into the chamber is quickly washed to the bottom of the chamber and is circulated with the hydroponic nutrient solution through a filter where it can be removed.

The illumination sources which are closely adjacent the wall are, in the preferred embodiment, beneath transparent shields which prevent the light source from becoming wet with solution and which maintain the inevitable corners connecting the light sources to a source of energy from becoming breeding places for undesirable plant life.

Thus, the device of this invention has an interior that is particularly free of protected areas where moisture and fungus or mold may accumulate.

It has also been found that small quantities of a specific type of fungicide, along with the filter system, will maintain the fungus problems within the device of this invention substantially completely controlled. The fungicides are of the quarternary alkyl ammonium halide types. One particulrly useful fungicide is alkyl dimethyl benzyl ammonium chloride which, in quantities of from about 10 to about 100 parts per million, will maintain the interior of the chamber substantially free of fungus. These fungicides are water soluble and they can circulate dissolved in the nutrient solution to repeatedy treat the sidewalls of the chamber as well as the seeds and growing plants.

DETAILED DESCRIPTION OF THE INVENTION

The invention may be better understood with reference to the accompanying drawings which illustrate certain embodiments thereof.

Figure 1:
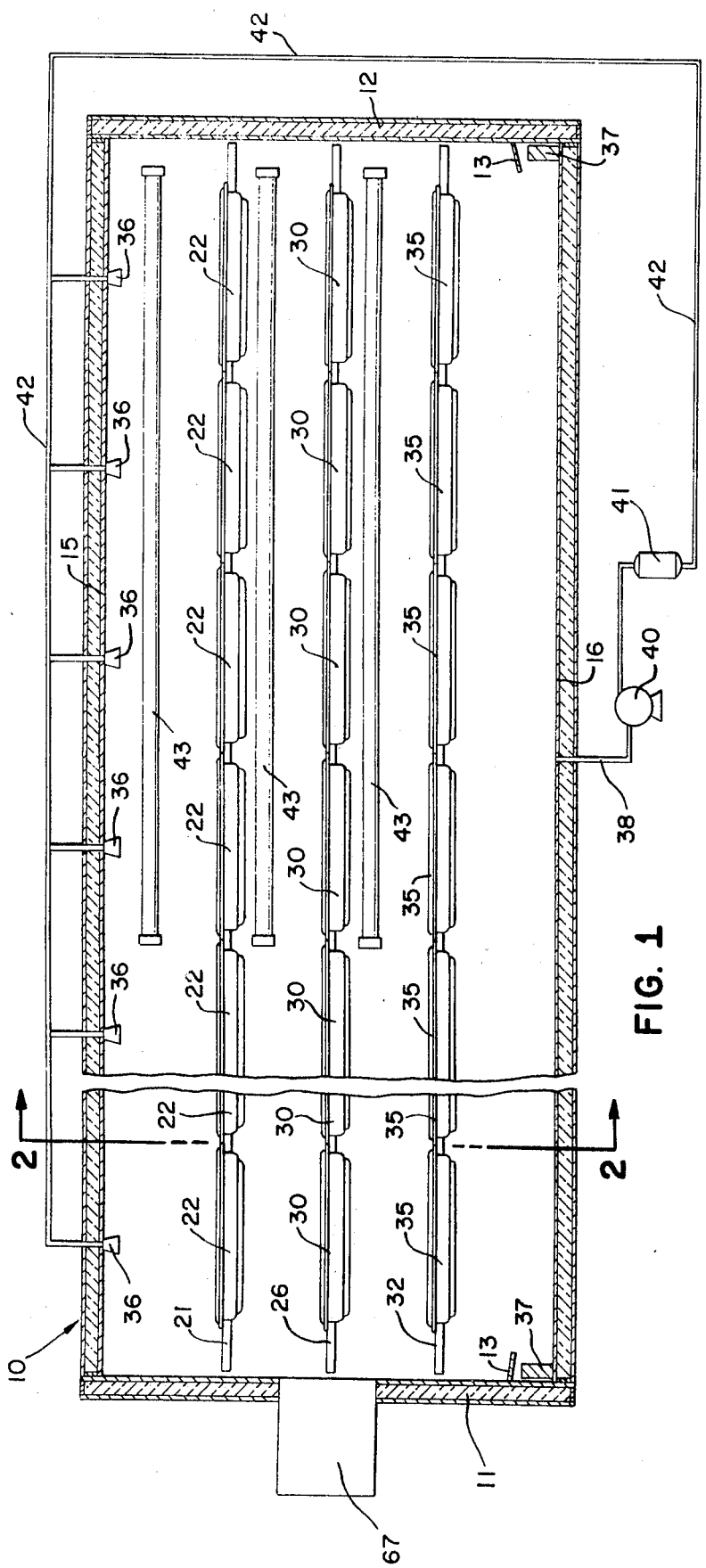
FIG. 1 is a partial elevation view in section and partly schematic which illustrates a device embodying this invention.
Figure 4:
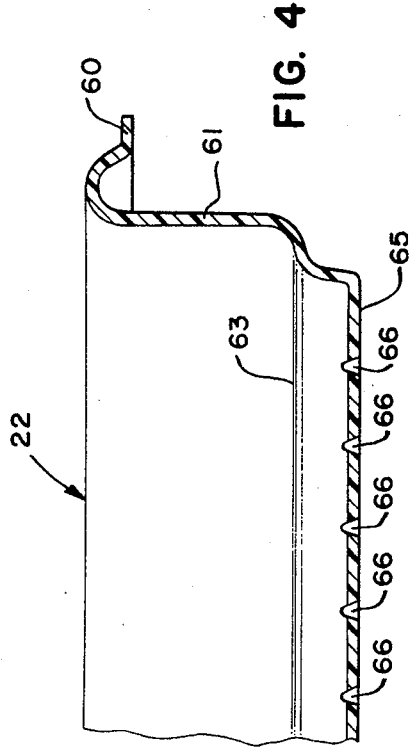
FIG. 4 is a partial sectional view of a tray suitable for use in the device of this invention.
Figure 2:
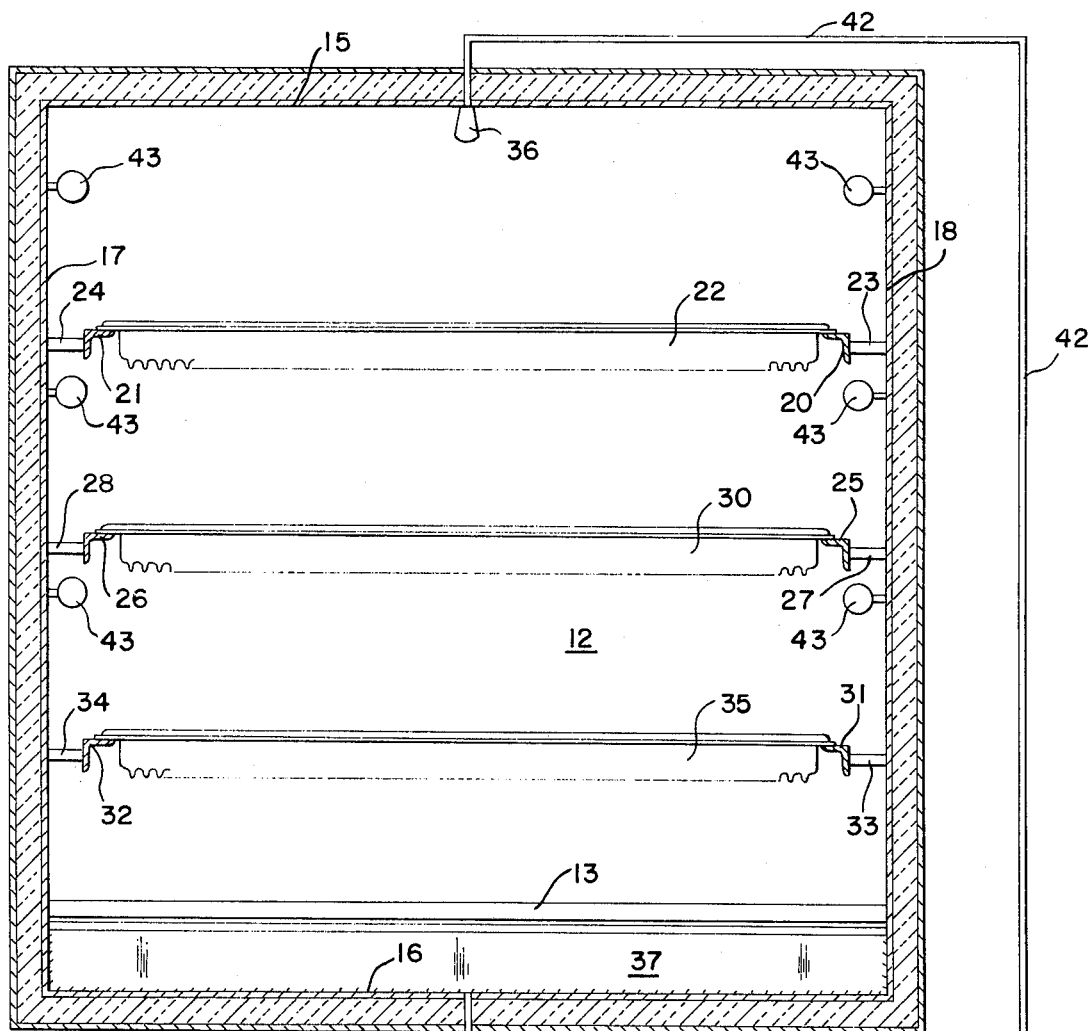
FIG. 2 is a sectional view of FIG. 1 taken along the line 2—2.

The device of this invention includes a cabinet generally designated 10 in the form of an elongated chamber having an inlet door 11 at one end and an outlet door 12 at the other. The inlet door and outlet door are suitably hinged and provided with whatever gaskets or means such as baffles 13 as are appropriate to avoid leakage of liquid. The elongated cabinet is also provided with a ceiling 15, a floor 16, and sidewalls 17 and 18.

Within the chamber 10 a number of supports are positioned. The uppermost supports 20 and 21 are a pair which are in the same horizontal plane so that they may support a tray 22 horizontally. The supports are spaced from the wall with spacers 23 and 24 so that both the tray 22 and the supports 21 and 22 are out of contact with the walls 17 and 18. Another pair of supports 25 and 26 are held from the sidewalls with spacers 27 and 28 to support another tray 30 horizontally between the sidewalls. The tray 30 is positioned immediately beneath the tray 22 and desirably the upper portion of the tray 30 is about nine inches below the lower portion of the tray 22. A third row of trays is similarly held. Supports 31 and 32 are held by spacers 33 and 34 to hold a tray 35 horizontally and immediately below trays 22 and 30.

Thus, as illustrated, three horizontal rows of trays are suspended between the sidewalls of the chamber 10 so that the trays superimpose one another but are spaced about nine inches apart. It is not essential to the invention that the trays superimpose one another, but it is essential to the invention that each tray be of such length that, when supported on its respective supports, it extends one-seventh of the distance between the inlet door 11 and the outlet door 12 so that each horizontal row of trays will be at least seven trays in length.

In the embodiment illustrated herein, a number of sprinkler heads 36 are mounted on the ceiling and positioned to spray liquid over the upper surface of the tray 22. The floor 16 is provided with adequate sills 37 to become a sump for collecting liquid which is withdrawn via line 38 and pumped by pump 40 through a filter 41 and then through line 42 to supply the sprinkler heads 36 with liquid.

Starting at a position about three tray lengths from the inlet door, the sidewalls 17 and 18 are provided with elongated fluorescent tubes 43. The light tubes are positioned on the sidewalls so that one pair is provided for each horizontal row of trays, and one is positioned on each sidewall to illuminate the upper surface of the tray. Preferably the light tubes 43 are positioned immediately beneath the bottom of the next higher trays to provide maximum illumination to all portions of the tray even when the height of the grass in the tray becomes relatively high.

In different embodiments, the light fixtures may occupy different positions; for example, tubes may be positioned across the chamber and beneath the trays rather than along the sidewalls depending upon how tall the plant product becomes and how many sets of trays, side by side, may be employed.

Figure 3:
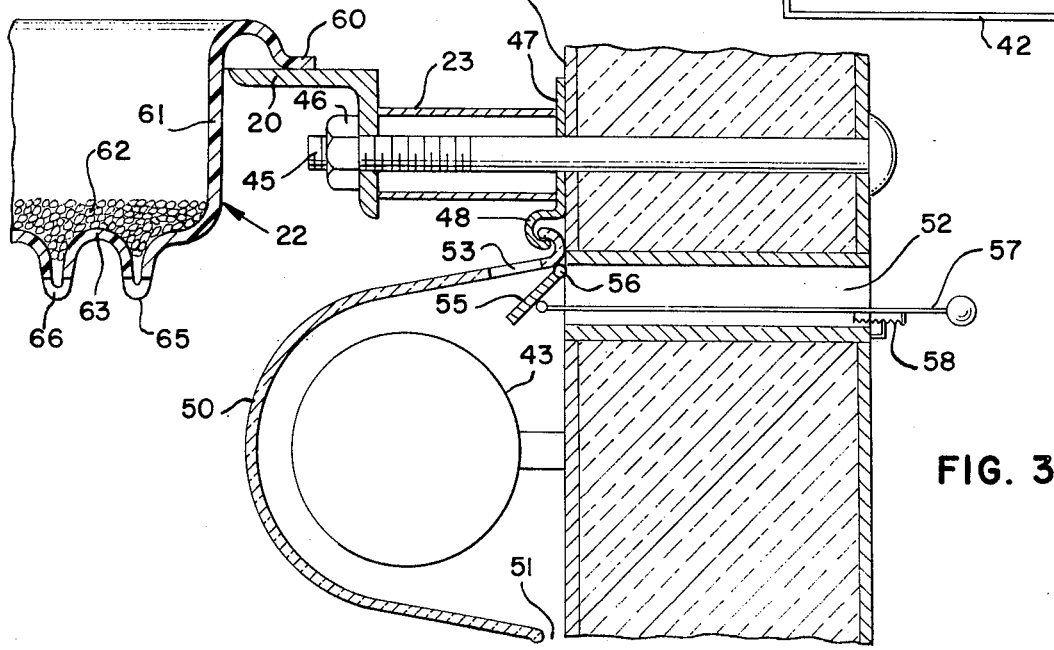
FIG. 3 is a sectional view showing in detail one suitable tray suspension means and illumination assembly for use in the device of this invention.

A particularly desirable embodiment is illustrated in FIG. 3. In FIG. 3 a tray, such as tray 22, is supported by a support such as support 20 which is held by spacer 27 from the wall 18. The spacer 27 is held with a suitable bolt 45 and nut 46 which hold both the support 20 and the spacer 27 firmly. An insert 47 behind the spacer 27 is shaped to provide a holding element 48 which is adapted to engage the transparent cover 50 in a shinglelike engagement which holds the cover 50 closely adjacent the wall 18 but does not permit accumulation of liquid behind the transparent cover 50. The transparent cover 50 is formed so that its bottom edge is spaced from the wall 18 providing a circulation space 51 whose function will be described below. A vent hole 52 is provided through the wall 18 to open in the upper portion of the chambeer formed by cover 50. The cover 50 may, in a preferred embodiment, be provided with an opening 53, and a damper 55 is provided to swing between one extreme position wherein it closes the opening 53 and another extreme position where it closes the vent hole 52. As illustrated, the damper 55 is in an intermediate position. The damper is provided with a suitable hinge 56 and an operating means, shown here for the purposes of illustration as a handle 57 having a locking means 58 associated with it.

The trays are formed with a flange-like perimeter 50 which engages the support. The flange 60 is connected to a sidewall 61 which is deep enough to contain the seeds 62 contained in the tray. The bottom of the tray is corrugated having wide upper corrugations 63 and very narrow corrugations 65. The distance between adjacent sidewalls of the lower corrugations, as best illustrated in FIg. 3, is too small to admit the seeds into the lower portion of the corrugation and in that way avoids having any seeds lying in a pool of liquid. By causing the seeds to bridge the opening into the lower portion of each corrugation, the construction of the tray 22 also avoids clogging of openings 66 so that drainage of liquid is not prevented.

It is important in producing plant material with the hydroponic techniques that the temperature within the growing chamber be controlled. The temperature in the growing chamber desirably is about 65° F. The device of this invention may include a refrigerator 67 which is conveniently located in the inlet door of the device. Although the refrigerator 67 could be located anywhere, location in the inlet door is convenient in that the device is then oriented to circulate cooling air longitudinally through the chamber 10.

The operation of the device of this invention is as follows. A tray 22 is filled with a layer of seeds to an appropriate depth; the seeds are leveled; and the tray is placed on supports 20 and 21. Trays 30 and 35 are similarly loaded and placed on their appropriate supports to form a column of trays spaced from one another about nine inches and immediately above one another. Door 11 is then closed and the appropriate amount of nutrient solution is sprayed via spray head 36 onto the upper surface of tray 22. The nutrient solution trickles down through the seeds in the tray 22 and discharges through opening 66 thereby falling into the tray 30 where it then trickles through the seeds in tray 30 and falls into tray 35, after which the solution falls to the floor of the chamber 16 and forms a pool. Spraying is continued for a sufficient time to make the seeds wet enough to cause germination, after which the spraying is stopped. From experience and from a knowledge of which particular seeds are employed, spraying may be conducted intermittently so that the proper degree of wetness to promote germination is obtained. The trays will remain in their position on supports 20 and 21 for a 24-hour period. After a 24-hour period, another set of trays 22, 30 and 35 are filled with seeds to the appropriate depth and placed on the appropriate supports. In pushing the second set of trays onto the supports, the first set is advanced one tray length toward the outlet door. Although trays 22, 30 and 35 are distinguished as different trays, they will all have the same construction; the only distinction between them being in their position with respect to the top or the bottom of the chamber.

Each 24-hour period this process is repeated so that the first trays advance toward the outlet door one tray-length each day. By the third day the seeds have begun to germinate, and by the third day the trays have advanced far enough toward the outlet door 12 so that they are exposed to illumination from light sources 43. At this point the process becomes a growing process rather than a germination process, and nutrients are taken up by the plants to promote plant growth. Since the plant materials are constantly maintained moist with nutrients and subjected to intense light for 24 hours a day and under ideal temperature and humidity conditions for growth, growth progresses rapidly. For example, with barley seed, within 7 days the grass is 9 inches high and weighs seven times as much as the seeds that were introduced into the chamber. The number of days each different species of plant life is maintained in the chamber to obtain maximum growth may differ. With barley seed, 7 days in the chamber produces rich grass 9 inches deep. Additional days will produce greater growth which may or may not be economical depending upon the additional weight gain as compared with the cost of nutrients and energy.

When each of the supports are full of trays, then at each 24-houd interval the outlet door 12 will first be opened; the final tray on each support will be removed; the inlet door 11 will be opened; and a new tray will be introduced on each support so that each tray advances one tray-length toward the outlet door again. The trays removed by the outlet door may be harvested; and the grass, in the as-harvested condition, is healthful and highly palatable food for a wide variety of animals.

The product recovered from the process of this invention has been used successfully for feeding cattle, poultry, pigs, and even game animals. The product is freshly grown, free of weeds or undesirable wild plants, free of insecticides, dust and soil, and may be eaten in its entirety, roots and all, to provide a nourishing diet for livestock. It has been found that one device of this invention carrying three tiers of trays, seven trays long, can produce enough food to maintain at least five beef cattle. It has also been found that the cost of food is about one third the cost of meadow-grown food in addition to providing the advantage of having a constant and reliable production throughout the year.

Germination and growing of plants generates heat and usually devices in accordance with this invention will be employed outdoors or in unheated environments. Accordingly, it is important that some temperature controls be maintained within the chambers. As stated above, refrigerator 67 is provided to avoid high temperatures within the growing chamber. In order for refrigerator 67 to function most efficiently, the vent hole and damper system shown in FIG. 3 is employed. When the refrigerator 67 is operative, the damper 55 will cover opening 53 so that heat from light 43 may be vented through the vent hole 52 to the exterior of the chamber. The opening 51 provides an inlet for cool air so that natural circulation caused by the rising of hot air will draw cool air through opening 51 and vent hot air out through the vent 52. When refrigeration is not required, and in fact when heat is required to maintain the temperature within the chamber, the damper 55 will be positioned to close the vent hole 52. When vent hole 52 is closed and opening 53 is open, the natural circulation of air past light 43 will cause heat to pass through hole 53 thereby warming the interior of the chamber. The amount of illumination employed in the small volume enclosed by the chamber is ordinarily enough to maintain the temperature warm enough to promote seed germination and plant growth.

From the foregoing description, it is evident that the device of this invention employed with the method of this invention, provides for economical, efficient, and continuous production of large quantities of plant material.

What is claimed is:

1. A device for hydroponic growth of plants from seed which comprises:
   A. an elongated chamber having an inlet door and an outlet door for the ends thereof, a floor, a ceiling, and sidewalls; said floor, ceiling, and sidewalls being of smooth, nonporous material,
   B. a plurality of elongated supports mounted in pairs to support a plurality of trays horizontally and at different elevations, such supports being held by and spaced from said sidewalls,
   C. a plurality of trays positioned horizontally on said supports, said trays being in length at most one seventh the length of said chamber and each tray having
      i. a support-engaging perimeter,
      ii. a corrugated bottom wherein the upper portion of each corrugation is rounded and the lower portions of adjacent corrugations are spaced too close together to admit said seeds to the bottom of said corrugations,
      iii. the lower portion of each corrugation having a plurality of drainage holes therein,
   D. a plurality of illumination sources suitable for photosynthesis positioned within said chamber to illuminate the upper surface of said trays between said outlet door and an intermediate position between said outlet door and said inlet door,
   E. ultrasonic nebulizer means for subdividing a liquid positioned to provide subdivided liquid above the uppermost of said trays, and
   F. a pump to circulate liquid from the floor of said chamber to said means for subdividing liquid.

2. A device for hydroponic growth of plants from seed which comprises:
   A. an elongated chamber having an inlet door and an outlet door for the ends thereof, a floor, a ceiling, and sidewalls; said floor, ceiling, and sidewalls being of smooth, nonporous material,
   B. a plurality of elongated supports mounted in pairs to support a plurality of trays horizontally and at different elevations, such supports being held by and spaced from said sidewalls,
   C. a plurality of trays positioned horizontally on said supports, said trays being in length at most one seventh the length of said chamber and each tray having
      i. a support-engaging perimeter,
      ii. a corrugated bottom wherein the upper portion of each corrugation is rounded and the lower portions of adjacent corrugations are spaced too close together to admit said seeds to the bottom of said corrugations,
      iii. the lower portion of each corrugation having a plurality of drainage holes therein,
   D. A plurality of illumination sources suitable for photosynthesis positioned within said chamber to illuminate the upper surface of said trays between said outlet door and an intermediate position between said outlet door and said inlet door, with each illumination source surrounded with a transparent shield sealed against the sidewall at the top and spaced from the sidewall at the bottom, said sidewall having a vent therethrough extending from the region adjacent the upper portion of said shield and out of the chamber, each of said shields having and opening immediately above the vent in the sidewall and a movable baffle mounted on said sidewall to move between a position closing said vent and a position closing the opening in said shield.
   E. means for subdividing a liquid positioned to provide subdivided liquid above the uppermost of said trays, and
   F. a pump to circulate liquid from the floor of said chamber to said means for subdividing liquid.

* * * * *